(12) United States Patent
Yamashita

(10) Patent No.: US 7,259,973 B2
(45) Date of Patent: Aug. 21, 2007

(54) SEMICONDUCTOR APPARATUS FOR CONTROLLING A SWITCHING POWER SUPPLY

(75) Inventor: Tetsuji Yamashita, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 323 days.

(21) Appl. No.: 11/061,743

(22) Filed: Feb. 22, 2005

(65) Prior Publication Data

US 2005/0189821 A1 Sep. 1, 2005

(30) Foreign Application Priority Data

Feb. 27, 2004 (JP) ............................. 2004-052585

(51) Int. Cl.
*H02M 3/335* (2006.01)
(52) U.S. Cl. .................................... 363/21.16; 363/132
(58) Field of Classification Search ............... 363/132, 363/21.16, 21.12, 49
See application file for complete search history.

(56) References Cited

U.S. PATENT DOCUMENTS 4,063,307 A * 12/1977 Stephens .................. 363/21.17

FOREIGN PATENT DOCUMENTS

JP 2002-315333 10/2002

* cited by examiner

*Primary Examiner*—Shawn Riley
(74) *Attorney, Agent, or Firm*—Steptoe & Johnson LLP

(57) ABSTRACT

In a semiconductor apparatus for controlling a switching power supply including a switching element and a switching operation control circuit, the switching operation of the switching element is controlled as follows: a comparison is made between an output voltage of an I-V converter, which detects the current of a control terminal and converts the current into a voltage, and a reference voltage of predetermined upper and lower limit voltages for detecting a standby state, and the switching operation of the switching element is stopped when the output voltage of the I-V converter is lower than the standby detection lower limit voltage, and the switching operation of the switching element is restarted when the output voltage of the I-V converter is higher than the standby detection upper limit voltage.

6 Claims, 7 Drawing Sheets

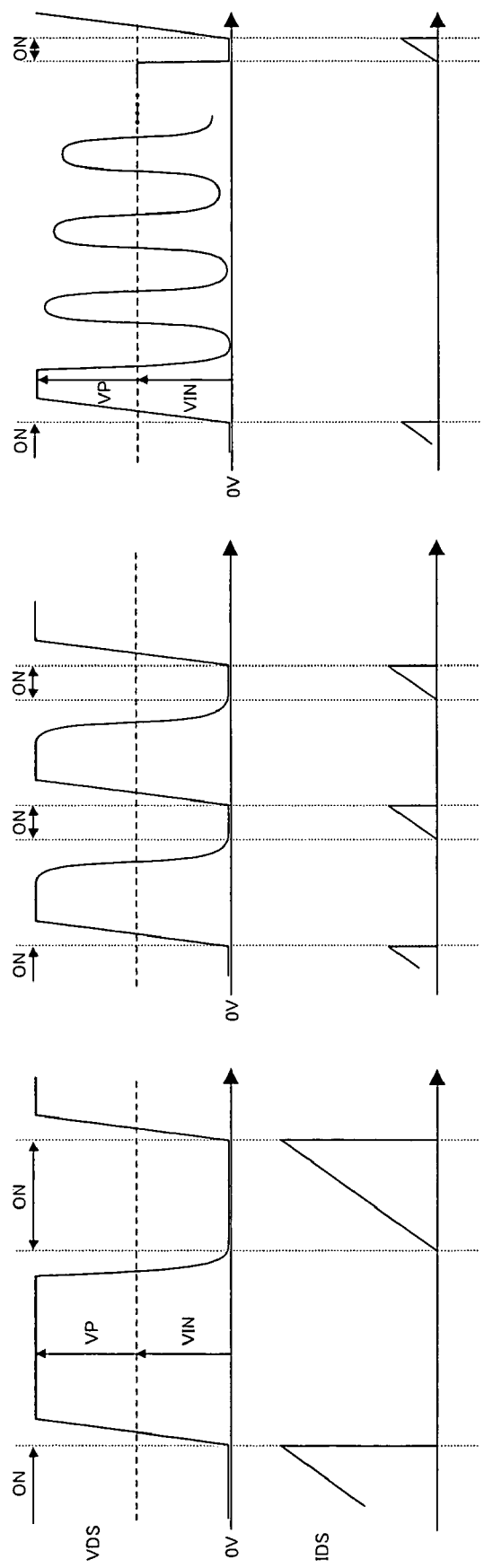
F I G. 4

STATE OF OUTPUT SIGNAL
VO1 OF COMPARATOR 22

SEMICONDUCTOR APPARATUS FOR CONTROLLING A SWITCHING POWER SUPPLY

FIELD OF THE INVENTION

The present invention relates to a semiconductor apparatus for controlling a switching power supply whereby the output voltage of the switching power supply is controlled by a switching operation.

BACKGROUND OF THE INVENTION

Conventionally, switching power supply units using semiconductor apparatuses for controlling switching power supplies are widely used as power supplies for home appliances such as home electrical products, thereby to improve power efficiency with low power consumption. In the semiconductor apparatus, an output voltage is controlled (stabilized) by using the switching operation of a semiconductor (a switching element such as a transistor).

Particularly in recent years, in view of the prevention of global warming, attention has focused on a reduction of power consumption in a standby state of appliances such as home electrical products and thus switching power supply units achieving lower power consumption during standby are in great demand.

In order to meet the demand, a power supply system or the like is developed for properly using two switching power supply units according to an operation mode of an appliance. For example, a switching power supply unit for a main power supply is provided to supply power at rated load in a normal operation (normal mode) of the appliance, and a switching power supply unit only for a standby state is separately provided to supply power during standby in a standby operation (standby mode) of the appliance. When the appliance is in a standby state, power is supplied from the switching power supply only for a standby state. At rated load, power is supplied from the switching power supply for the main power supply.

However, this power supply system requires two switching power supply units (converters), increasing the cost of the overall circuit including the semiconductor apparatuses for controlling the switching power supplies. Therefore, when lower cost is strongly demanded, a power supply system constituted of a single switching power supply unit (converter) is used in many cases. In this case, switching power supply units of partial resonance have been frequently used in view of efficiency of a power supply and noise.

In such a conventional semiconductor apparatus for controlling a switching power supply, a current applied to a switching element is reduced at a light load, e.g., during standby. However, it is always necessary to supply, via a transformer, the internal circuit current of the semiconductor apparatus for controlling the switching power supply. Therefore, it is not possible to reduce a current flowing to the switching power supply, including a current flowing to the switching element, to 0 and thus a certain amount of current is applied even at no load. Hence, the switching operation of the switching element causes a loss even at no load and a lighter load causes a larger loss in the switching element. Consequently, the switching power supply decreases in power efficiency and thus it is not possible to meet the need for lower power consumption in a standby state of the power supply.

Further, the switching power supply of partial resonance mentioned above has the following problem: since the switching power supply has a high oscillation frequency at a light load, a switching loss increases and efficiency decreases in a standby mode.

As a solution for reduced efficiency in a standby mode, a method is available for intermittently performing a switching operation in response to a standby signal from the outside. However, this method increases the cost because another expensive oscillation circuit has to be separately provided to intermittently oscillate a power supply in a standby mode. Further, in the event of an improper period and duty for intermittent oscillation, an output voltage has a higher ripple, resulting in no practical applicability.

Japanese Patent Laid-Open No. 2002-315333 discloses another conventional control technique, in which a microcomputer detects a loaded state on the secondary side of a power supply, a transition is made to a standby mode in response to a signal, and oscillation is performed intermittently according to a commercial frequency. However, an oscillation frequency cannot be changed according to the loaded state in an intermittent switching operation and thus the efficiency of the power supply during standby is not sufficiently improved.

DISCLOSURE OF THE INVENTION

The present invention is devised to solve the conventional problems and has as an object to provide a semiconductor apparatus for controlling a switching power supply, which reduces the current loss of a switching element during standby to reduce power consumption during standby, and achieves high efficiency, low noise, a low ripple of an output voltage, and low cost with ease over a wide load area including a standby mode.

In order to solver the problems, according to a semiconductor apparatus for controlling a switching power supply in which a direct-current input voltage is applied to a transformer via a switching element, a direct-current voltage obtained by rectifying and smoothing an alternating current generated in the transformer is controlled by the switching operation of the switching element, and power is supplied to a load, the switching element performing the switching operation controlled by a control signal supplied from a control circuit to the control electrode of the switching element, wherein the control circuit comprises a transformer reset detection circuit for detecting a reset state of the transformer by means of a transformer reset detection signal indicating the state, an I-V converter for converting into a voltage a current value of the control signal indicating a change of a direct-current voltage based on the alternating current generated on the secondary winding of the transformer, and a standby detection circuit for detecting a standby state during power supply to the load based on the detection signal of the transformer reset detection circuit and a change of an output voltage from the I-V converter and outputting a control signal for controlling an intermittent operation of switching performed by the switching element, wherein the standby detection circuit outputs the control signal for controlling the switching operation of the switching element as the control signal for controlling the switching of the switching element in such a way that the switching operation of the switching element is stopped when the output voltage from the I-V converter is lower than a standby detection lower limit voltage for detecting a standby state of power supply to the load based on the detection signal of the transformer reset detection circuit, and the switching operation of the switching element is restarted when the output voltage from the I-V converter is higher than a standby detection upper limit voltage for detecting a standby state of power supply to the load.

This configuration comprises the standby detection circuit for stopping and restarting the switching operation, in which the switching element is repeatedly turned on/off during standby. Thus, it is possible to reduce a period of the switching operation during standby and a current loss in the switching operation.

Further, the semiconductor apparatus for controlling a switching power supply according to the present invention comprises a detection voltage changing terminal for arbitrarily setting a reference voltage source of the standby detection circuit for stopping and restarting the switching operation of the switching element.

According to this configuration, since the detection voltage changing device is provided for arbitrarily setting the standby detection voltage, it is possible to optimally set a load current according to a load required in a standby state when the switching operation of the switching element is stopped and restarted.

In this way, it is possible to reduce power consumption during standby to improve power efficiency and achieve high efficiency, low noise, a low ripple of an output voltage, and low cost with ease over a wide load area including a standby mode.

BRIEF DESCRIPTION OF THE DRAWINGS

FIG. 4 is a waveform chart showing a change of a drain current in the semiconductor apparatus for controlling the switching power supply of Embodiment 1;

DESCRIPTION OF THE EMBODIMENTS

Referring to the accompanying drawings, a semiconductor apparatus for controlling a switching power supply will be specifically described below according to embodiments of the present invention.

(Embodiment 1)

The following will describe a semiconductor apparatus for controlling a switching power supply according to Embodiment 1 of the present invention.

Figure 1:
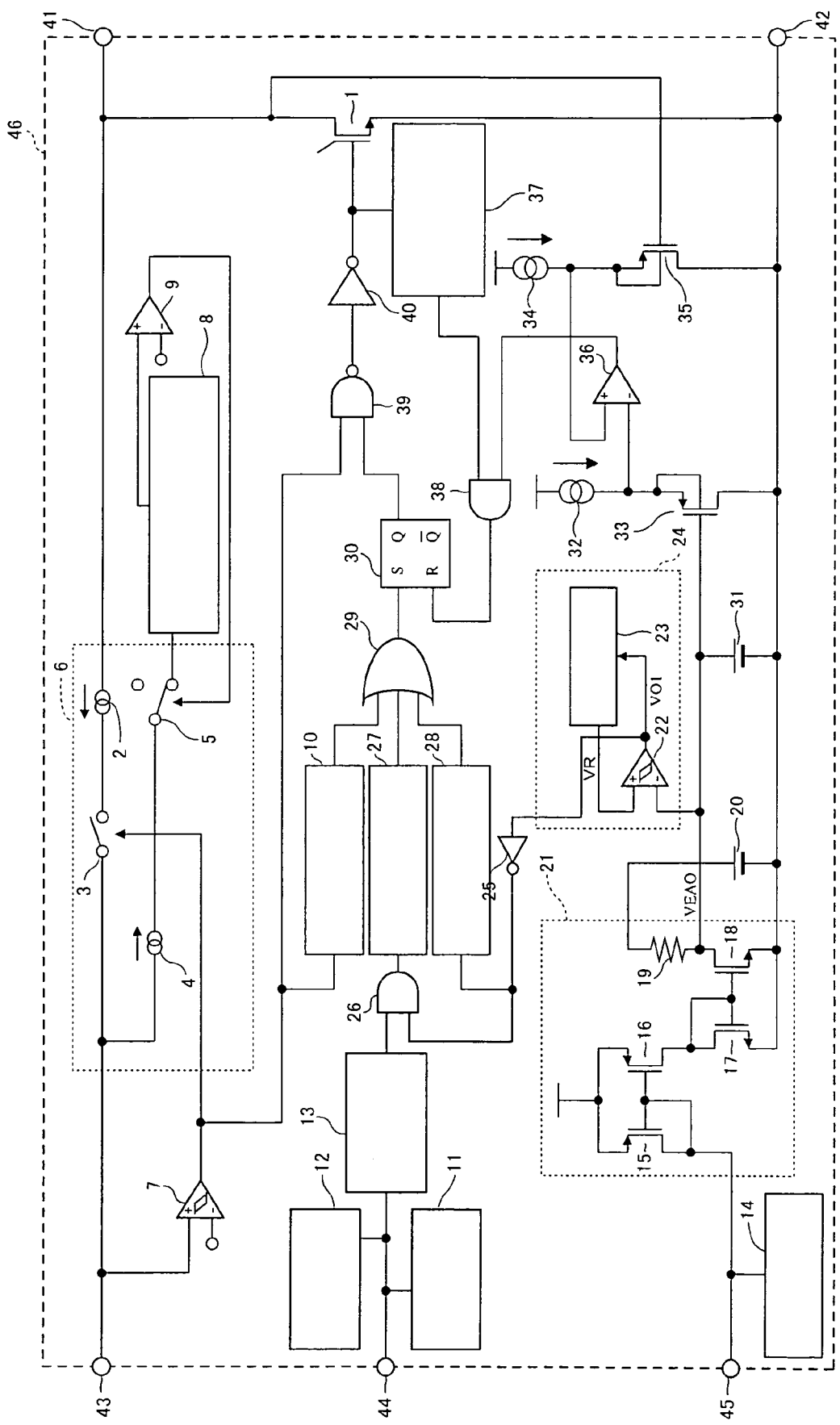
FIG. 1 is a circuit diagram showing a structural example of a semiconductor apparatus for controlling a switching power supply according to Embodiment 1 of the present invention.
Figure 7:
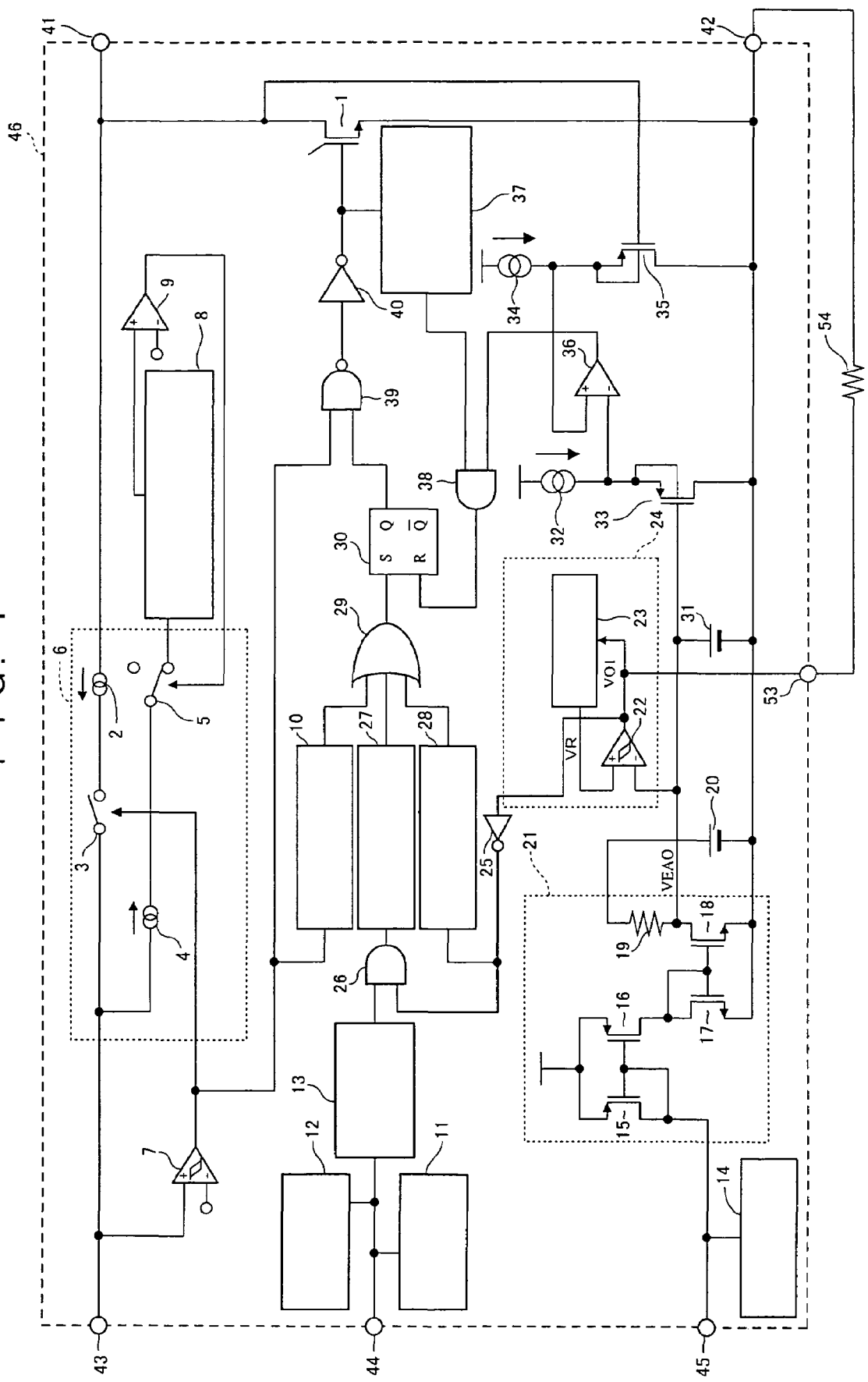
FIG. 7 is a circuit diagram showing a structural example of a semiconductor apparatus for controlling a switching power supply according to Embodiment 2 of the present invention.

FIG. 1 is a circuit diagram showing a structural example of the semiconductor apparatus for controlling the switching power supply according to Embodiment 1. The same constituent elements as FIG. 7 are indicated by the same reference numerals.

A semiconductor apparatus 46 for controlling a switching power supply comprises a standby light load detection circuit 24 which is fed with an output voltage VEAO obtained by converting a current applied from a control terminal 45 into a voltage by means of an I-V converter 21. The standby light load detection circuit 24 comprises a standby detecting comparator 22. The output voltage VEAO outputted from the I-V converter 21 is applied as the minus input of the standby detecting comparator 22, and a reference voltage VR outputted from a reference voltage source 23 is applied as the plus input of the standby detecting comparator 22. The standby detecting comparator 22 compares the inputted output voltage VEAO and the reference voltage VR. When the output voltage VEAO is lower than the reference voltage VR, the standby detecting comparator 22 outputs a predetermined output signal VO1 to an AND circuit 26 via an inverter 25. The output signal VO1 of standby detecting comparator 22 is also applied to the reference voltage source 23. The reference voltage source 23 changes the reference voltage VR in response to the output signal VO1 of the standby detecting comparator 22.

A clock signal is applied to the AND circuit 26 as another input signal. The clock signal is outputted from a transformer reset detection circuit 13 after the detection of a voltage of a transformer reset detecting terminal 44. The output of the AND circuit 26 is applied to a transformer reset pulse generator circuit 27 for generating a transformer reset pulse of one-shot pulse. When a standby state is detected, that is, when a switching element 1 is stopped, an amplitude of resonance determined by an inductance of the primary winding of a transformer and a capacitance between the drain and source of the switching element 1 is reduced according to a stop time and thus a transformer reset signal may not be detected. For this reason, the transformer reset pulse generator circuit 27 is not permitted to operate.

The output VO1 of the standby detecting comparator 22 is inputted to an intermittent end pulse generator circuit 28 via the inverter 25. After the stop time, the output of the intermittent end pulse generator circuit 28 is inputted to an OR circuit 29 and the output signal of the OR circuit 29 is inputted as the set signal of an RS flip-flop 30. The output signal of the RS flip-flop 30 is inputted to a NAND circuit 39 and the output of the NAND circuit 39 is outputted to the gate of the switching element 1 via a gate driver 40. In this way, when the standby detecting comparator 22 detects a standby state, the transformer reset detection circuit 13 is not operated. When the standby detecting comparator 22 detects a restoration signal, switching control is performed so as to restart the switching of the switching element 1 in response to the output signal of the intermittent end pulse generator circuit 28.

Figure 2:
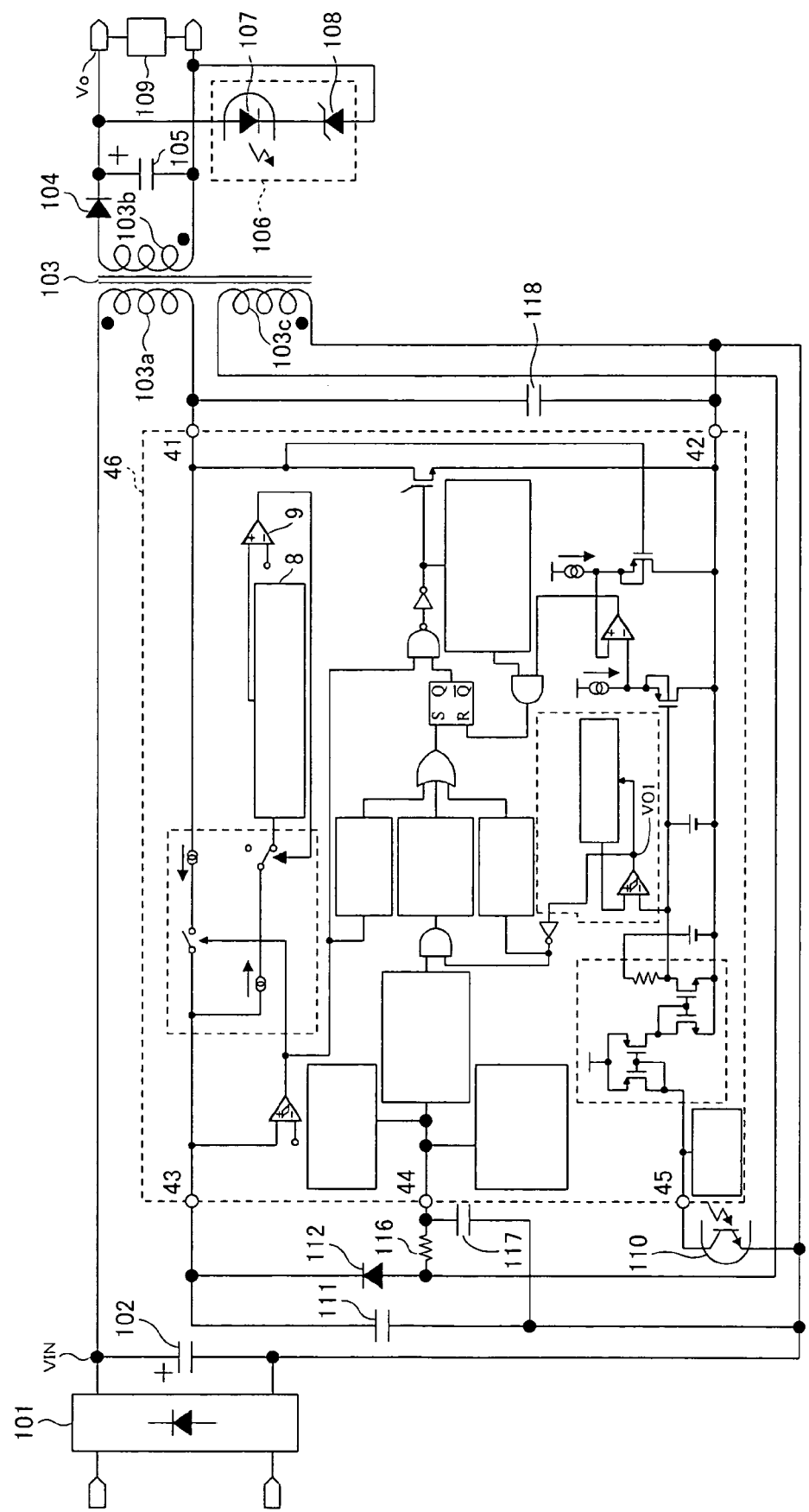
FIG. 2 is a circuit diagram showing a structural example of a switching power supply comprising the semiconductor apparatus for controlling the switching power supply of Embodiment 1.

FIG. 2 is a circuit diagram showing a structural example of a switching power supply using the semiconductor apparatus for controlling the switching power supply of Embodiment 1.

Figure 3:
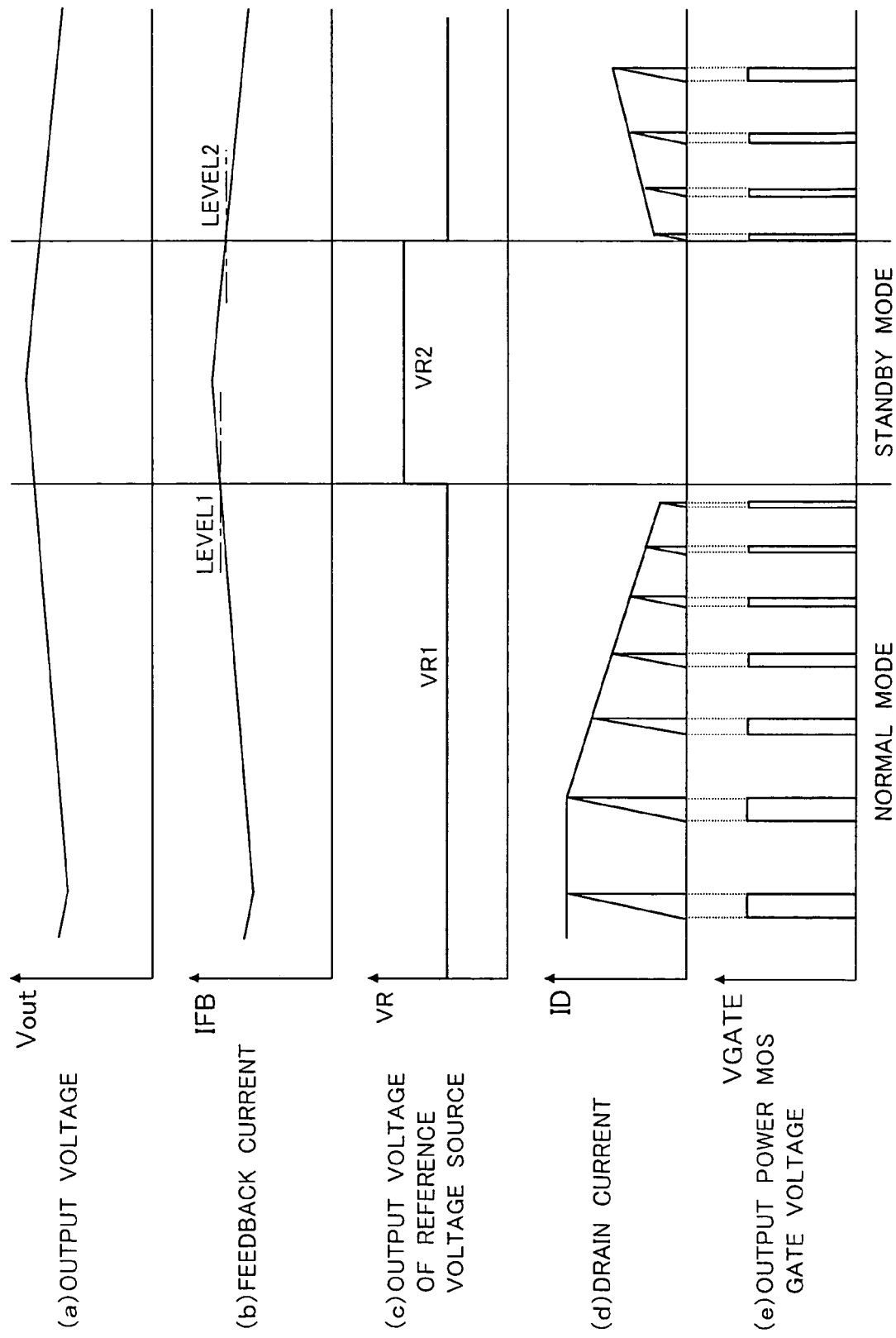
FIG. 3 is a time chart for explaining the operations of the semiconductor apparatus for controlling the switching power supply of Embodiment 1 and the switching power supply comprising the semiconductor apparatus for controlling the switching power supply of Embodiment 1.

Referring to the time chart of FIG. 3, the following will discuss operations performed at a light load by the semiconductor apparatus 46 configured thus for controlling the switching power supply and a switching power supply unit. The switching power supply unit is a ringing choke converter using partial resonance and is a structural example for explaining Embodiment 1.

In the semiconductor apparatus 46 for controlling the switching power supply, the switching element 1 including a power MOSFET and a control circuit for controlling the switching of the switching element 1 are integrated on the same semiconductor substrate. The semiconductor apparatus 46 for controlling the switching power supply is constituted of five terminals of an input terminal 41 and an output terminal 42 of the switching element 1, a starting voltage detecting terminal of the semiconductor apparatus 46 for controlling the switching power supply, a power supply terminal 43 of the control circuit, a control terminal 45 for inputting a control signal, and a voltage detecting terminal (transformer reset detecting terminal) 44 of a bias winding (tertiary winging) of a transformer 103.

A regulator 6 is connected between the input terminal 41 of the switching element 1, the starting voltage detecting terminal 43, the control circuit, and a reference power supply 8 for a gate driver. When the voltage of the input terminal 41 of the switching element 1 is equal to or higher than a certain voltage, control is performed in such a way that the internal circuit current of the semiconductor apparatus 46 for controlling the switching power supply is supplied and the comparator 9 causes the control circuit of the semiconductor apparatus 46 for controlling the switching power supply and the gate driver reference power supply 8 to have a constant voltage.

The output of a start/stop circuit comparator 7 is inputted to the NAND circuit 39 and the output signal of the NAND circuit 39 is outputted to the gate of the switching element 1 via the gate driver 40. The oscillation and stop of the switching element 1 are controlled according to a voltage of the terminal 43.

Reference numeral 14 denotes a clamp circuit which is connected to the control terminal 45 and is set at a constant potential because a phototransistor 110 or the like is connected to the outside of the semiconductor apparatus 46 for controlling the switching power supply.

Reference numeral 21 denotes the I-V converter which internally converts a current applied from the control terminal 45 into a voltage. A high-side clamp circuit 12 and a low-side clamp circuit 11 are connected to the terminal 44 for detecting the voltage of a bias winding 103c of the transformer 103 and regulates a voltage inputted to the inside of the semiconductor apparatus 46 for controlling the switching power supply. Further, the transformer reset detection circuit 13 is connected to the terminal 44, and the one-shot pulse (transformer reset) generator circuit 27 determines the timing of the turn-on signal of the switching element 1.

Reference numeral 10 denotes a start pulse generator circuit which generates an output in response to the output signal, that is, the start signal of the comparator 7. The output is inputted to the set terminal of the RS flip-flop 30 via the OR circuit 29 and an output Q of the RS flip-flop 30 is inputted to the NAND circuit 39.

The output signal Q of the RS flip-flop 30 is set at H by the start pulse signal upon startup and by the one-shot (transformer reset) pulse signal during a normal operation via the OR circuit 29, and the switching element 1 is turned on.

After the switching element 1 is turned on, a voltage generated by a current applied to the switching element 1 and the on-resistance of the switching element 1, that is, an on voltage is inputted to the plus side of a drain current detecting comparator 36. When the voltage is higher than a potential of the minus side, a signal outputted from the drain current detecting comparator 36, together with a signal from an on blanking pulse generator circuit 37, is inputted as the reset signal of the RS flip-flop 30 via an AND circuit 38, and the switching element 1 is turned off. That is, a drain current is regulated by detecting the on resistance of the switching element 1.

Further, a voltage generated by a constant-current source 32 and a P-type MOSFET 33 is applied to the minus side of the drain current detecting comparator 36 based on the output voltage VEAO which has been internally converted by the I-V converter 21 according to a current applied from a clamp circuit 31 and the control terminal 45. The upper limit (maximum drain current) of a drain current is regulated by the clamp circuit 31, so that the drain current of the switching element 1 can be changed according to the level of the output voltage VEAO from the I-V converter 21. That is, as a current applied from the control terminal 45 increases, the output voltage VEAO of the I-V converter 21 decreases. Thus, the minus side of the drain current detecting comparator 36 decreases in potential, so that the drain current of the switching element 1 decreases.

The output voltage VEAO of the I-V converter 21 that has been internally converted from the current of the control terminal 45 is detected and the voltage of the bias winding 103c of the transformer 103 is detected by the terminal 44, and the turning on/off period of the switching element 1 is determined by the output signal of the transformer reset pulse generator circuit 27 which generates a one-shot pulse from the output of the transformer reset detection circuit 13 for determining the timing to turn on the switching element 1.

In this switching power supply unit, a commercial AC power supply is rectified by a rectifier 101 such as a diode bridge and smoothed by an input capacitor 102, so that a direct-current voltage VIN is generated and is applied to the transformer 103. The transformer 103 for converting power has a primary winding 103a, a secondary winding 103b, and a tertiary winding (used as a bias winding) 103c. The direct-current voltage VIN is applied to the primary winding 103a.

The direct-current voltage VIN applied to the primary winding 103a of the transformer 103 is switched by the switching element 1 in the semiconductor apparatus 46 for controlling the switching power supply. Then, current is drawn to the secondary winding 103b of the transformer 103 by the switching operation of the switching element 1. The current drawn to the secondary winding 103b is rectified and smoothed by a diode 104 and a capacitor 105, which are connected to the secondary winding 103b, and is supplied to a load 109 as direct-current power of an output voltage VO.

For example, an output voltage detection circuit 106 constituted of an LED 107 and a Zener diode 108 is connected across the capacitor 105 and outputs a feedback signal for stabilizing the output voltage VO to the primary-side phototransistor 110 connected to the control terminal 45 of the semiconductor apparatus 46 for controlling the switching power supply.

The tertiary winding 103c of the transformer is connected to the starting voltage detecting terminal 43 via the bias winding voltage detecting terminal 44 and a diode 112. A capacitor 111 prevents a sharp decrease on the terminal 43, that is, stabilizes the terminal 43. A resistor 116 and a capacitor 117, which are connected to the terminal 44, generate a delay time and adjust the time when the terminal 44 detects the reset of the transformer. A capacitor 18 connected between the input and output of the switching element 1 determines a magnitude and period of ringing caused by resonance with the transformer 103.

The following will discuss the operations of the semiconductor apparatus 46 configured thus for controlling the switching power supply and the switching power supply unit.

When the AC power supply is inputted from a commercial power supply to the rectifier 101, the power supply is rectified and smoothed by the rectifier 101 and the capacitor 102 and is converted into the direct-current voltage VIN. The direct-current voltage VIN is applied to the primary winding 103a of the transformer 103. When the direct-current voltage VIN is equal to or higher than the certain value, charging current is applied to the capacitor 111 via the regulator 6 in the semiconductor apparatus 46 for controlling the switching power supply. When the voltage of the terminal 43 of the semiconductor apparatus 46 for controlling the switching power supply reaches a starting voltage set by the start/stop circuit comparator 7, control is started for the switching operation of the switching element 1.

A start pulse is generated by a start pulse generator circuit 10 based on the output signal of the start/stop circuit comparator 7 and the switching element 1 is turned on. Since the secondary side has a low output upon startup, no current is applied to the Zener diode 108 of the output voltage detection circuit 106 and thus no current is applied to the phototransistor 110. Therefore, the output voltage VEAO of the I-V converter 21 has a higher level than the clamp circuit 31 and the minus side of the drain current detecting comparator 36 is set at a voltage determined by the clamp circuit 31. When a start pulse is generated by the start pulse generator circuit 10 and the switching element 1 is turned on, a current is applied to the switching element 1 and an on voltage determined by a product of an on resistance is inputted to the plus side of the drain current detecting comparator 36. When the on voltage exceeds a voltage determined on the minus side, H is inputted to the reset terminal signal of the RS flip-flop 30 and the switching element 1 is turned off.

Thereafter, the voltage of the tertiary winding (bias winding) 103c of the transformer 103 is changed from positive to negative, that is, the input terminal 41 of the switching element 1 decreases in voltage due to resonance determined by the leakage inductance of the primary winding of the transformer 103 and a capacitance between input and output of the capacitor 118 and the switching element 1. At this point, a one-shot pulse signal is inputted as H by the transformer reset detection circuit 13 from the transformer reset pulse generator circuit 27 to the set terminal of the RS flip-flop 30 via the OR circuit 29, and the switching element 1 is turned on.

The detection time of the transformer reset detection circuit 13 is adjusted by the resistor 116 and the capacitor 117 which are connected between the tertiary winding (bias winding) 103c of the transformer 103 and the terminal 44. When the input terminal 41 of the switching element 1 is 0 volts, the switching element 1 is turned on.

The output voltage VO is increased by repeating the above-described switching operation. When the output voltage VO is equal to or higher than a voltage set by the output voltage detection circuit 106, the LED 107 is brought into conduction, a current is applied to the phototransistor 110, and a current is applied from the control terminal 45 of the semiconductor apparatus 46 for controlling the switching power supply. Since the output voltage VEAO of the I-V converter 21 decreases with the applied current, the drain current detecting comparator 36 decreases on the minus side and thus the drain current of the switching element 1 decreases. In this way, the on duty of the switching element 1 is changed to a proper state. That is, switching is turned on by the one-shot pulse outputted from the transformer reset pulse generator circuit 27 in response to the output signal from the transformer reset detection circuit 13, and the on duty of the switching element 1 is determined by the current applied from the control terminal 45.

That is, as shown in FIG. 4(b), under light-load conditions where a small amount of current is applied to the load 109, the drain current (IDS) of the switching element 1 is applied for a shorter period. Under heavy-load conditions (normal conditions) shown in FIG. 4(a), the drain current (IDS) of the switching element 1 is applied for a longer period.

In this way, the semiconductor apparatus 46 for controlling the switching power supply controls the drain current (IDS) of the switching element 1 and changes the on duty according to power supplied to the load 109 of the switching power supply. Further, the timing to turn on the switching element 1 is set so as to produce output when the input voltage of the switching element 1 is reduced to the minimum during resonance in a turned-off state, thereby hardly causing a switching loss in a turned-on state. That is, partial resonance is performed so as to make a switching loss negligible in the turned-on state. These operations can realize higher efficiency and low noise during normal operations.

The standby detecting comparator 22 compares the output voltage VEAO, which is obtained by converting a current applied from the control terminal 45 into a voltage by means of the I-V converter 21, and the reference voltage VR of the reference voltage source 23. The reference voltage VR of the reference voltage source 23 first serves as a standby detection lower limit voltage VR1 (FIG. 3(c)). In a standby state and so on where the load 109 connected to the output of the switching power supply decreases in current supply, as current supply to the load increases, the output voltage VO increases (FIG. 3(a)) and the current of the phototransistor 110 is increased by the LED 107. This current increases a current applied from the control terminal 45 and thus the converted voltage VEAO of the I-V converter 21 decreases according to equation (1) below:

$$VEAO = V0 - R \times I \quad (1)$$

where V0 represents a predetermined reference voltage of a reference voltage source 20, R represents a resistance of a resistor 19, and I represents a value of current passing through the resistor 19. The current is obtained by an internal mirror circuit which converts a current applied from the control terminal 45.

Figure 5:
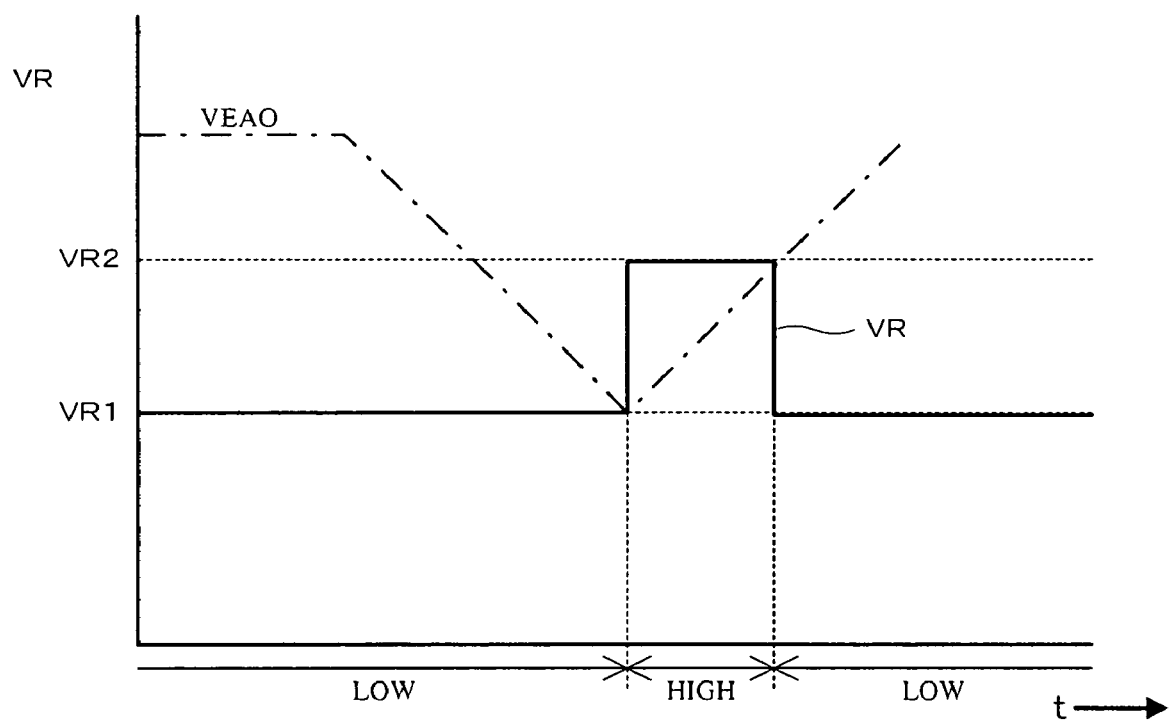
FIG. 5 is a time chart for explaining the operations of a reference voltage source in the semiconductor apparatus for controlling the switching power supply of Embodiment 1.

Therefore, according to equation (1), as a current flowing from the control terminal 45 increases, the output voltage VEAO of the I-V converter 21 decreases. Accordingly, the reference voltage source (minus side) of the drain current detecting comparator 36 decreases, the drain current of the switching element 1 gradually decreases, and power supply to the load 109 also decreases. When the converted voltage VEAO of the I-V converter 21 is lower than the standby detection lower limit voltage VR1, a standby state is detected and the output signal VO1 of the standby detecting comparator 22 changes from a low level to a high level (FIG. 5).

Thus, the output of the AND circuit 26 that has passed through the inverter 25 becomes a low level and the one-shot pulse signal of the transformer reset pulse generator circuit 27 is not outputted, thereby stopping the switching operation of the switching element 1. At the same time, the reference voltage VR of the reference voltage source 23 is changed from the standby detection lower limit voltage VR1 to a standby detection upper limit voltage VR2 in response to the output signal VO1 of the standby detecting comparator 22 (FIG. 3(c)).

When the switching operation of the switching element 1 is stopped and the switching element 1 is turned off, no current flows to the switching element 1. Accordingly, no power is supplied to the load 109 and thus the output voltage VO to the load 109 gradually decreases. Therefore, the output voltage VEAO of the I-V converter 21 gradually increases. Since the output voltage of the reference voltage source 23 is the standby detection upper limit voltage VR2, which is higher than the standby detection lower limit voltage VR1, the switching operation of the switching element 1 is not immediately restarted as shown in FIG. 5.

When the output voltage VO to the load 109 further decreases and the output voltage VEAO of the I-V converter 21 exceeds the standby detection upper limit voltage VR2, the output signal VO1 of the standby detecting comparator 22 becomes a low level. In response to the signal, the signal of the intermittent end pulse generator circuit 28 is outputted after passing through the inverter 25. The switching operation of the switching element 1 is restarted in response to the output signal. At the same time, the transformer reset detection circuit 13 having been stopped by the AND circuit 26 becomes effective, and the normal turning on/off of partial resonance is restarted in the switching element 1 in response to the one-shot pulse output signal of the transformer reset pulse generator circuit 27.

At the same time, the reference voltage VR of the reference voltage source 23 is changed from the standby (low load) detection upper limit voltage VR2 to the standby (low load) detection lower limit voltage VR1. When the switching operation of the switching element 1 is restarted, the on-duty of the switching element 1 is larger than that obtained in the detection of a standby state. Thus, excessive power is supplied to the load 109, the output voltage VO to the load increases again, and the output voltage VEAO of the I-V converter 21 decreases. When a standby state is detected again, the switching operation performed by repeatedly turning on/off the switching element 1 is stopped.

In this way, the reference voltage VR from the reference voltage source 23 is changed from the standby detection lower limit voltage VR1 to the standby detection upper limit voltage VR2 by detecting a standby state. Thus, during the detection of a standby state, switching control of repeatedly turning on/off the switching element 1 exhibits intermittent oscillation in which stop and restart are repeated.

The output voltage VO to the load 109 decreases when the intermittent oscillation is stopped. A degree of reduction depends upon a current supplied to the load 109. That is, the output voltage VO of the load 109 decreases gently as current consumed in the load 109 decreases, and the stop period of the intermittent oscillation becomes longer as current consumed by the load 109 decreases. Thus, as the load becomes lighter, the switching operations of the switching element 1 are reduced.

Figure 6:
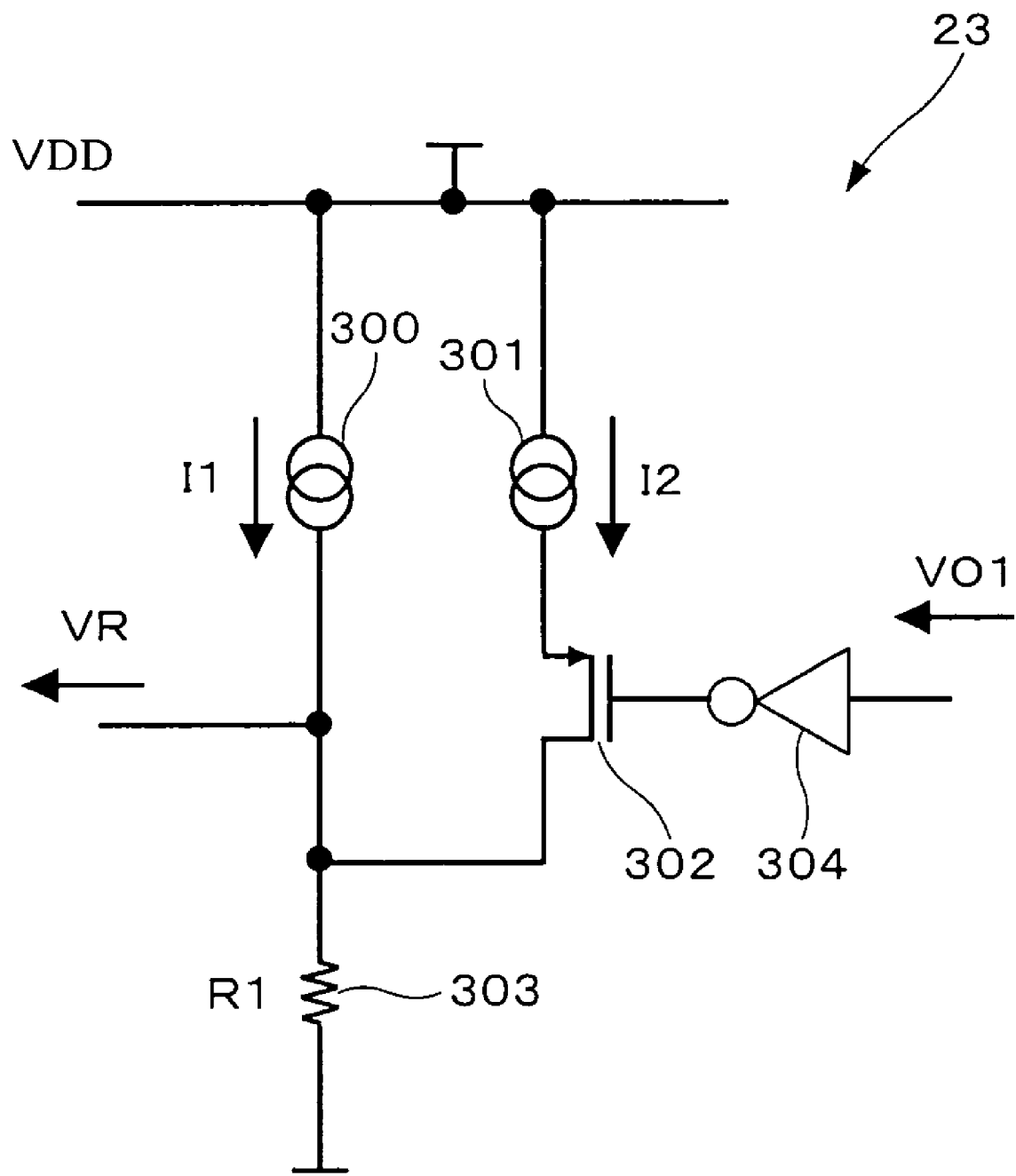
FIG. 6 is a circuit diagram showing a structural example of the internal circuit of the reference voltage source in the semiconductor apparatus for controlling the switching power supply of Embodiment 1.

FIG. 6 is a circuit diagram showing a structural example of the reference voltage source 23 of the standby light load detection circuit 24. The reference voltage source 23 is constituted of a constant-current source 300 for determining the reference voltage VR of the reference voltage source 23, a constant-current source 301, a resistor 303, a switching element 302 such as a P-type MOSFET, and an inverter circuit 304.

The constant-current source 300 supplies a constant current I1 and is connected to the resistor 303. The constant-current source 301 supplies a constant current I2 and is connected to the resistor 303 via the switching element (P-type MOSFET) 302. The output signal VO1 of the standby detecting comparator 22 is inputted to an input terminal such as the gate of the switching element 302 via the inverter circuit 304. A voltage generated by the constant-current source 300, the constant-current source 301, and the resistor 303 is outputted as the reference voltage VR of the reference voltage source 23 and is inputted to the plus terminal of the standby detecting comparator 22.

The following will discuss the operations of the standby light load detection circuit 24 configured thus.

As shown in FIG. 5, before a standby state is detected, the output signal VO1 of the standby detecting comparator 22 is set at a low level (LOW) and thus the switching element 302 is turned off. Therefore, the reference voltage VR of the reference voltage source 23 at this point, i.e., the standby detection lower limit voltage VR1 is expressed by equation (2) below:

$$VR1 = R1 \times (I1) \tag{2}$$

On the other hand, when a standby state is detected, the output signal VO1 of the standby detecting comparator 22 is set at a high level (HIGH). Thus, the switching element 302 is turned on and the current I2 supplied from the constant-current source 301 flows to the resistor 303. Therefore, the reference voltage VR of the reference voltage source 23 at this point, i.e., the standby detection upper limit voltage VR2 is expressed by equation (3) below:

$$VR2 = R1 \times (I1 + I2) \tag{3}$$

In this way, the reference voltage VR of the reference voltage source 23 becomes equal to the standby detection lower limit voltage VR1 or the standby detection upper limit voltage VR2 according to the output signal VO1 of the standby detecting comparator 22, thereby exhibiting intermittent oscillation in a standby state (FIGS. 3(d) and 3(e)).

In Embodiment 1, the constant current value for setting the output voltage of the reference voltage source 23 is changed according to the output signal VO1 of the standby detecting comparator 22. A resistance for setting the output voltage of the reference voltage source 23 may be changed according to the output signal VO1 of the standby detecting comparator 22.

(Embodiment 2)

The following will describe a semiconductor apparatus for controlling a switching power supply according to Embodiment 2 of the present invention.

FIG. 7 is a circuit diagram showing a structural example of a semiconductor apparatus 46 for controlling a switching power supply according to Embodiment 2. The semiconductor apparatus 46 for controlling the switching power supply comprises a terminal 53 for arbitrarily setting a voltage detected in a standby state. The terminal 53 connects an external resistor 54 for adjusting a standby detection voltage. The resistor 54 serves as a device for changing a detection voltage. Other configurations are similar to those of the semiconductor apparatus 46 for controlling the switching power supply in FIG. 1.

The resistor 54 for adjusting a standby detection voltage is provided between the potential of the minus terminal of a standby detecting comparator 22 and a reference potential to adjust a reference voltage outputted from a reference voltage source 23. A standby detection voltage VR inputted to the plus terminal of the standby detecting comparator 22 is adjusted by changing the value of the resistor 54 for adjusting a standby detection voltage.

In this way, the resistor 54 for adjusting a standby detection voltage is provided to arbitrarily adjust a standby detection voltage, so that a load current for stopping and restarting the switching operation of a switching element 1 can be optimally adjusted according to a load required in a standby state.

What is claimed is:

1. A semiconductor apparatus for controlling a switching power supply in which a direct-current input voltage is applied to a transformer via a switching element, a direct-current voltage obtained by rectifying and smoothing an alternating current generated in the transformer is controlled by a switching operation of the switching element, and power is supplied to a load, the switching element performing the switching operation controlled by a control signal supplied from a control circuit to a control electrode of the switching element, wherein the control circuit comprises:

a transformer reset detection circuit for detecting a reset state of the transformer by means of a transformer reset detection signal indicating the state;

an I-V converter for converting into a voltage a current value of the control signal indicating a change of a direct-current voltage based on the alternating current generated on a secondary winding of the transformer; and a standby detection circuit for detecting a standby state during power supply to the load based on the detection signal of the transformer reset detection circuit and a change of an output voltage from the I-V converter, and outputting a control signal for controlling an intermittent operation of switching performed by the switching element, wherein the standby detection circuit outputs the control signal for controlling the switching operation of the switching element as the control signal for controlling the switching of the switching element in such a way that the switching operation of the switching element is stopped when the output voltage from the I-V converter is lower than a standby detection lower limit voltage for detecting a standby state of power supply to the load based on the detection signal of the transformer reset detection circuit, and the switching operation of the switching element is restarted when the output voltage from the I-V converter is higher than a standby detection upper limit voltage for detecting a standby state of power supply to the load.

2. The semiconductor apparatus for controlling the switching power supply according to claim 1, wherein the standby detection circuit comprises a reference voltage source for outputting two different constant voltages of the standby detection upper limit voltage and the standby detection lower limit voltage, and a standby detection comparator for comparing a converted voltage of the I-V converter and an output voltage of the reference voltage source, wherein the output voltage of the reference voltage source is changed to the standby detection upper limit voltage and the standby detection lower limit voltage in response to an output signal of the standby detection comparator.

3. The semiconductor apparatus for controlling the switching power supply according to claim 1, further comprising a detection voltage changing terminal for arbitrarily setting the reference voltage source of the standby detection circuit for stopping and restarting the switching operation of the switching element.

4. The semiconductor apparatus for controlling the switching power supply according to claim 3, further comprising a resistor connected between the detection voltage changing terminal and a ground, the resistor changing a setting of the reference voltage source of the standby detection circuit.

5. The semiconductor apparatus for controlling the switching power supply according to claim 1, wherein the switching element and the control circuit are integrated on the same semiconductor substrate, and the semiconductor substrate has at least, as external connecting terminals, a switching element input terminal for inputting the input voltage to the switching element via a primary winding of the transformer, a switching element output terminal for outputting a switching current obtained by the switching operation of the switching element, a power supply terminal for supplying to the control circuit a direct-current voltage based on a current generated on a tertiary winding of the transformer by the switching operation of the switching element, a control terminal for inputting a control signal for controlling the intermittent operation of the switching performed by the switching element, and a transformer reset detecting terminal for supplying the transformer reset detection signal to the transformer reset detection circuit.

6. The semiconductor apparatus for controlling the switching power supply according to claim 3, wherein the switching element and the control circuit are integrated on the same semiconductor substrate, and the semiconductor substrate has at least, as external connecting terminals, a switching element input terminal for inputting the input voltage to the switching element via a primary winding of the transformer, a switching element output terminal for outputting a switching current obtained by the switching operation of the switching element, a power supply terminal for supplying to the control circuit a direct-current voltage based on a current generated on a tertiary winding of the transformer by the switching operation of the switching element, a control terminal for inputting a control signal for controlling the intermittent operation of the switching performed by the switching element, and a transformer reset detecting terminal for supplying the transformer reset detection signal to the transformer reset detection circuit.

* * * * *